US007991239B2

(12) United States Patent
Novikov (10) Patent No.: US 7,991,239 B2
(45) Date of Patent: Aug. 2, 2011

(54) METHODS, SYSTEMS AND APPARATUSES FOR IMAGER ROW-WISE NOISE CORRECTION

(75) Inventor: Vladimir Novikov, Arcadia, CA (US)

(73) Assignee: Aptina Imaging Corporation, George Town (KY)

( * ) Notice: Subject to any disclaimer, the term of this patent is extended or adjusted under 35 U.S.C. 154(b) by 1007 days.

(21) Appl. No.: 11/896,079

(22) Filed: Aug. 29, 2007

(65) Prior Publication Data

US 2009/0060337 A1  Mar. 5, 2009

(51) Int. Cl.
 *G06K 9/40* (2006.01)
(52) U.S. Cl. ........ 382/254; 382/260; 382/274; 382/275; 358/3.26; 358/3.27; 358/463
(58) Field of Classification Search .................. 382/260, 382/274, 275, 282; 358/3.26, 3.27, 463
See application file for complete search history.

(56) References Cited

U.S. PATENT DOCUMENTS

| 6,567,028 | B2 | 5/2003 | Huang et al. |
| 6,637,896 | B2 * | 10/2003 | Li et al. .......................... 353/119 |
| 6,796,655 | B2 * | 9/2004 | Seki ................................. 353/20 |
| 7,536,093 | B2 * | 5/2009 | Kita ................................. 396/72 |
| 2004/0051798 | A1 | 3/2004 | Kakarala et al. |
| 2005/0243193 | A1 | 11/2005 | Gove et al. |
| 2006/0192864 | A1 | 8/2006 | Mauritzson |
| 2007/0019085 | A1 | 1/2007 | Suzuki |
| 2007/0041062 | A1 | 2/2007 | Chinnaveerappan et al. |

FOREIGN PATENT DOCUMENTS

| WO | WO 2001/022618 A1 | 3/2001 |
| WO | WO 2007/024581 A1 | 3/2007 |

OTHER PUBLICATIONS

"Noise Sources in CMOS Image Sensors," Hewlett-Packard Components Group, Image Products Operations, Jan. 4,1998 (www.stw.tu-ilmenau.de/~ff/beruf_cc/cmos/cmos_noise.pdf) (2 pgs).
Matt Borg, et al., "Digital imaging using CMOS sensors," Agilent Technologies, Co., Ltd., (www.eetasia.com/ARTICLES/2001APR/2001/2001APR02_MSD_TAC.PDF?SOURCES=DOWNLOAD-Supplemental Result) (no date) (11 pgs).

* cited by examiner

*Primary Examiner* — Yosef Kassa (57) ABSTRACT

Methods, systems and apparatuses that provide improved row-wise digital correction in an imager. During image processing, row-wise noise is corrected by applying a fractional portion of a maximum digital correction to the pixels. The maximum digital correction is determined from light shielded reference pixels in each row. During imager calibration, a preferred digital correction fraction is determined and used for correction.

11 Claims, 7 Drawing Sheets

METHODS, SYSTEMS AND APPARATUSES FOR IMAGER ROW-WISE NOISE CORRECTION

FIELD OF THE INVENTION

Embodiments relate generally to imaging devices and more particularly to methods, systems and apparatuses for digital correction of row-wise noise in imaging devices.

BACKGROUND

A CMOS imager circuit includes a focal plane array of pixels, each of the pixels including a photosensor, for example, a photogate, photoconductor or a photodiode overlying a substrate for accumulating photo-generated charge in the underlying portion of the substrate. Each pixel has a readout circuit that includes at least an output field effect transistor and a charge storage region formed on the substrate connected to the gate of an output transistor. The charge storage region may be constructed as a floating diffusion region. Each pixel may include at least one electronic device such as a transistor for transferring charge from the photosensor to the storage region and one device, also typically a transistor, for resetting the storage region to a predetermined charge level.

In a CMOS imager, the active elements of a pixel perform the necessary functions of: (1) photon to charge conversion; (2) accumulation of image charge; (3) resetting the storage region to a known state; (4) transfer of charge to the storage region; (5) selection of a pixel for readout; and (6) output and amplification of a signal representing pixel charge. The charge at the storage region is typically converted to a pixel output voltage by a source follower output transistor.

Figure 1:
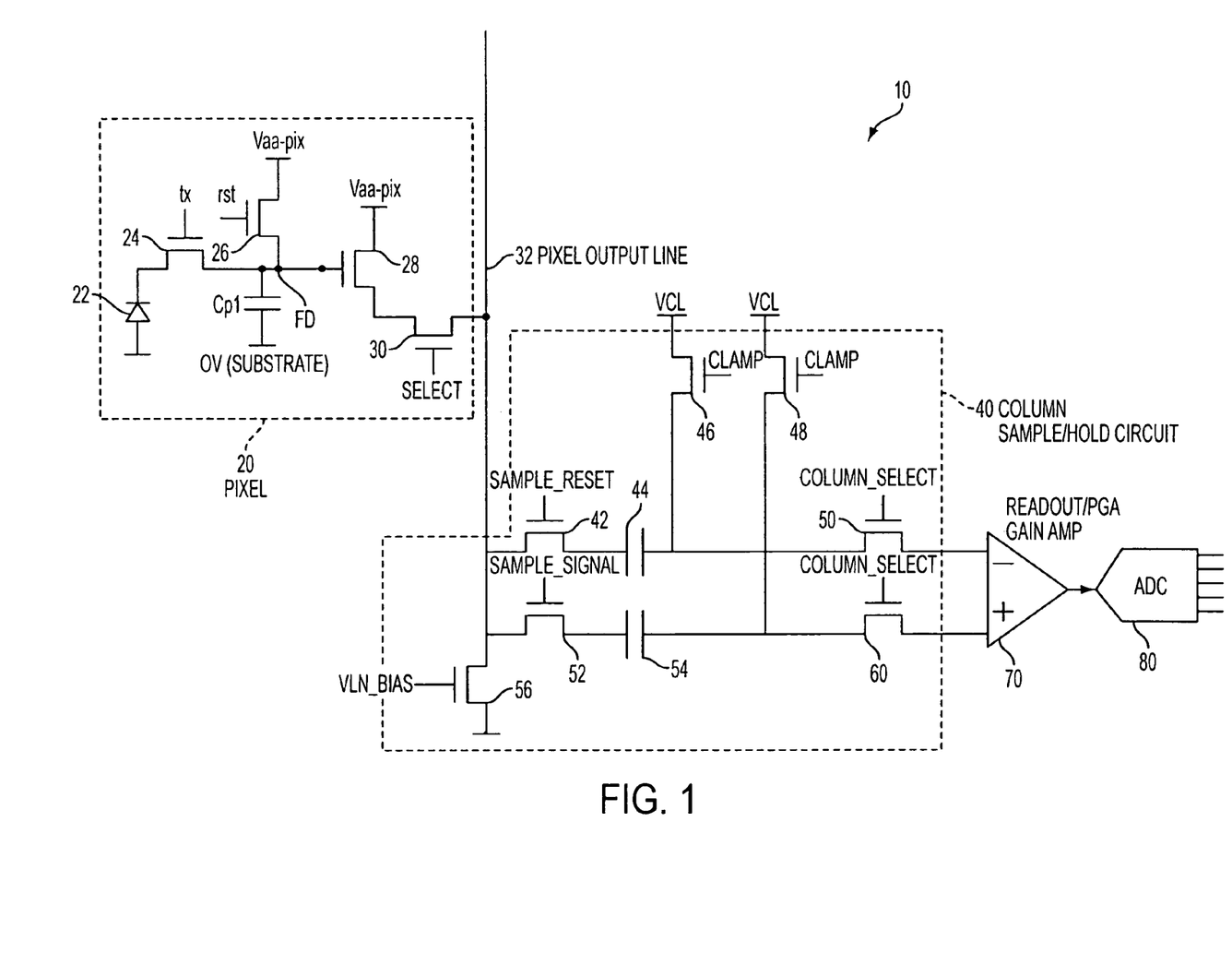
FIG. 1 is a diagram of a portion of a conventional CMOS imager.

FIG. 1 illustrates a portion of a conventional CMOS imager 10. The illustrated imager 10 includes a pixel 20, one of many that are in a pixel array (not shown), connected to a column sample and hold circuit 40 by a pixel output line 32. The imager 10 may also include a readout programmable gain amplifier (PGA) 70 and an analog-to-digital converter (ADC) 80.

The illustrated pixel 20, which is representative of a four transistor pixel construction, includes a photosensor 22 (e.g., a pinned photodiode, photogate, etc.), transfer transistor 24, floating diffusion region FD, reset transistor 26, source follower transistor 28 and row select transistor 30. FIG. 1 also illustrates parasitic capacitance Cp1 associated with the floating diffusion region FD and the pixel's 20 substrate. The photosensor 22 is connected to the floating diffusion region FD by the transfer transistor 24 when the transfer transistor 24 is activated by a transfer control signal TX. The reset transistor 26 is connected between the floating diffusion region FD and an array pixel supply voltage Vaa-pix. A reset control signal RST is used to activate the reset transistor 26, which resets the floating diffusion region FD as is known in the art.

The source follower transistor 28 has its gate connected to the floating diffusion region FD and is connected between the array pixel supply voltage Vaa-pix and the row select transistor 30. The source follower transistor 28 converts the stored charge at the floating diffusion region FD into an electrical output voltage signal. The row select transistor 30 is controllable by a row select signal SELECT for selectively connecting the source follower transistor 28 and its output voltage signal to the pixel output line 32, which is a column line of a pixel array.

The column sample and hold circuit 40 typically includes a bias transistor 56, controlled by a control voltage Vln_bias, that is used to bias the pixel output line 32. The pixel output line 32 is also connected to a first capacitor 44 thru a sample and hold reset signal switch 42. The sample and hold reset signal switch 42 is controlled by the sample and hold reset control signal SAMPLE_RESET. The pixel output line 32 is also connected to a second capacitor 54 thru a sample and hold pixel signal switch 52. The sample and hold pixel signal switch 52 is controlled by the sample and hold pixel control signal SAMPLE_SIGNAL. The switches 42, 52 are typically MOSFET transistors.

A second terminal of the first capacitor 44 is connected to the amplifier 70 via a first column select switch 50, which is controlled by a column select signal COLUMN_SELECT. The second terminal of the first capacitor 44 is also connected to a clamping voltage VCL via a first clamping switch 46. Similarly, the second terminal of the second capacitor 54 is connected to the amplifier 70 by a second column select switch 60, which is controlled by the column select signal COLUMN_SELECT. The second terminal of the second capacitor 54 is also connected to the clamping voltage VCL by a second clamping switch 48. A cross bar switch may also be provided across the lines, interconnecting capacitors 44 and 54 with their respective column select switches 50, 60.

The clamping switches 46, 48 are controlled by a clamping control signal CLAMP. As is known in the art, the clamping voltage VCL is used to place a charge on the two capacitors 44, 54 when it is desired to store the reset and pixel signals, respectively (when the appropriate sample and hold control signals SAMPLE_RESET, SAMPLE_SIGNAL are also generated).

Figure 2:
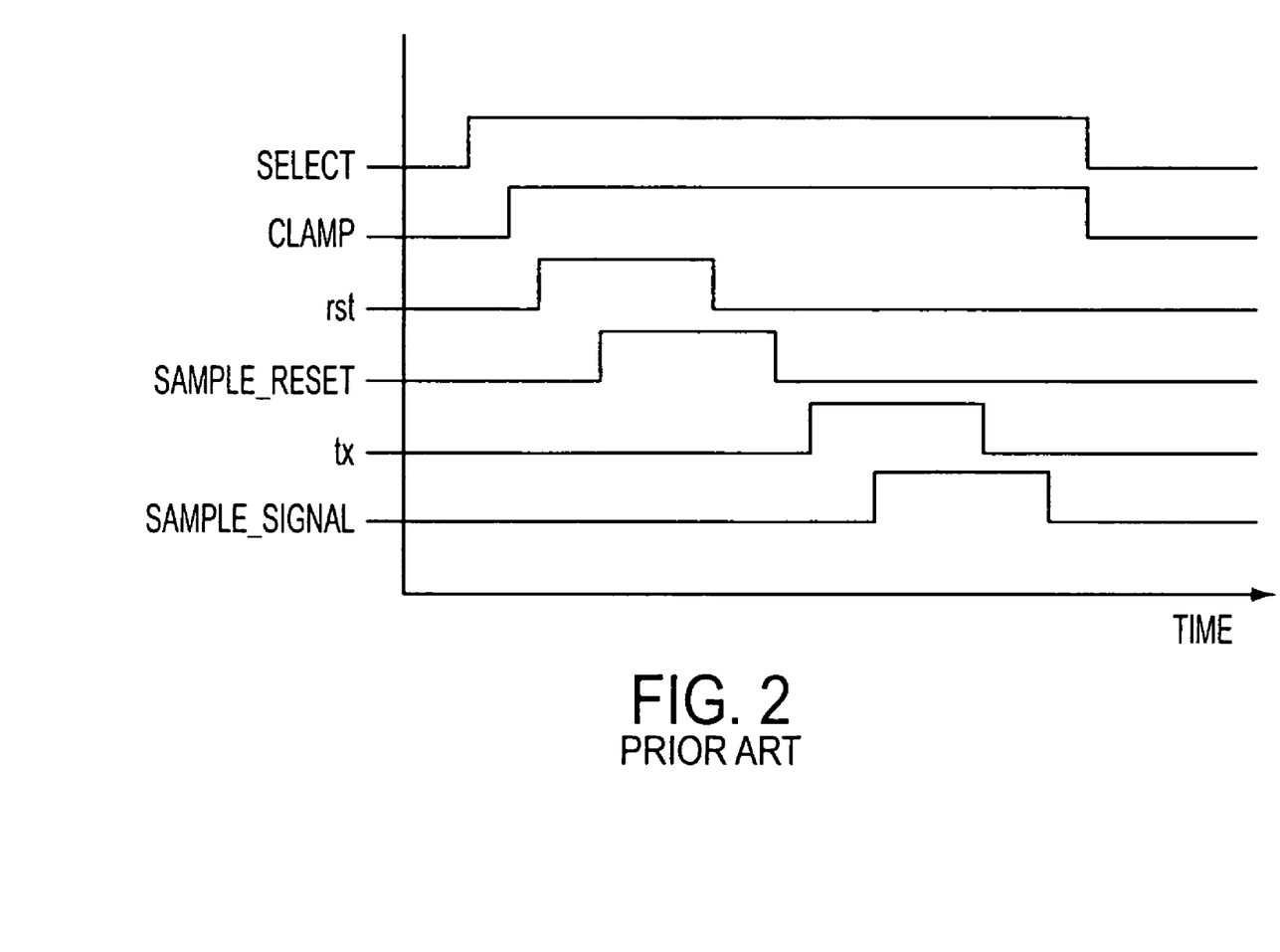
FIG. 2 is a timing diagram of the operation of the FIG. 1 imager.

Referring to FIGS. 1 and 2, in operation, the row select signal SELECT is driven high, which activates the row select transistor 30. When activated, the row select transistor 30 connects the source follower transistor 28 to the pixel output line 32. The clamping control signal CLAMP is driven high to activate the clamping switches 46, 48, allowing the clamping voltage VCL to be applied to the second terminal of the sample and hold capacitors 44, 54. The reset signal RST is then pulsed to activate the reset transistor 26, which resets the floating diffusion region FD. The signal on the floating diffusion region FD is sampled when the sample and hold reset control signal SAMPLE_RESET is pulsed. At this point, the first capacitor 44 stores the pixel reset signal $V_{rst}$.

Thereafter, the transfer transistor control signal TX is pulsed, causing charge from the photosensor 22 to be transferred to the floating diffusion region FD. The signal on the floating diffusion region FD is sampled when the sample and hold pixel control signal SAMPLE_SIGNAL is pulsed. At this point, the second capacitor 54 stores a pixel image signal $V_{sig}$. A differential signal ($V_{rst}$-$V_{sig}$) is produced by the differential amplifier 70. The differential signal is digitized by the analog-to-digital converter 80. The analog-to-digital converter 80 supplies the digitized pixel signals to an image processor circuit (not shown), which forms a digital image output.

Figure 3:
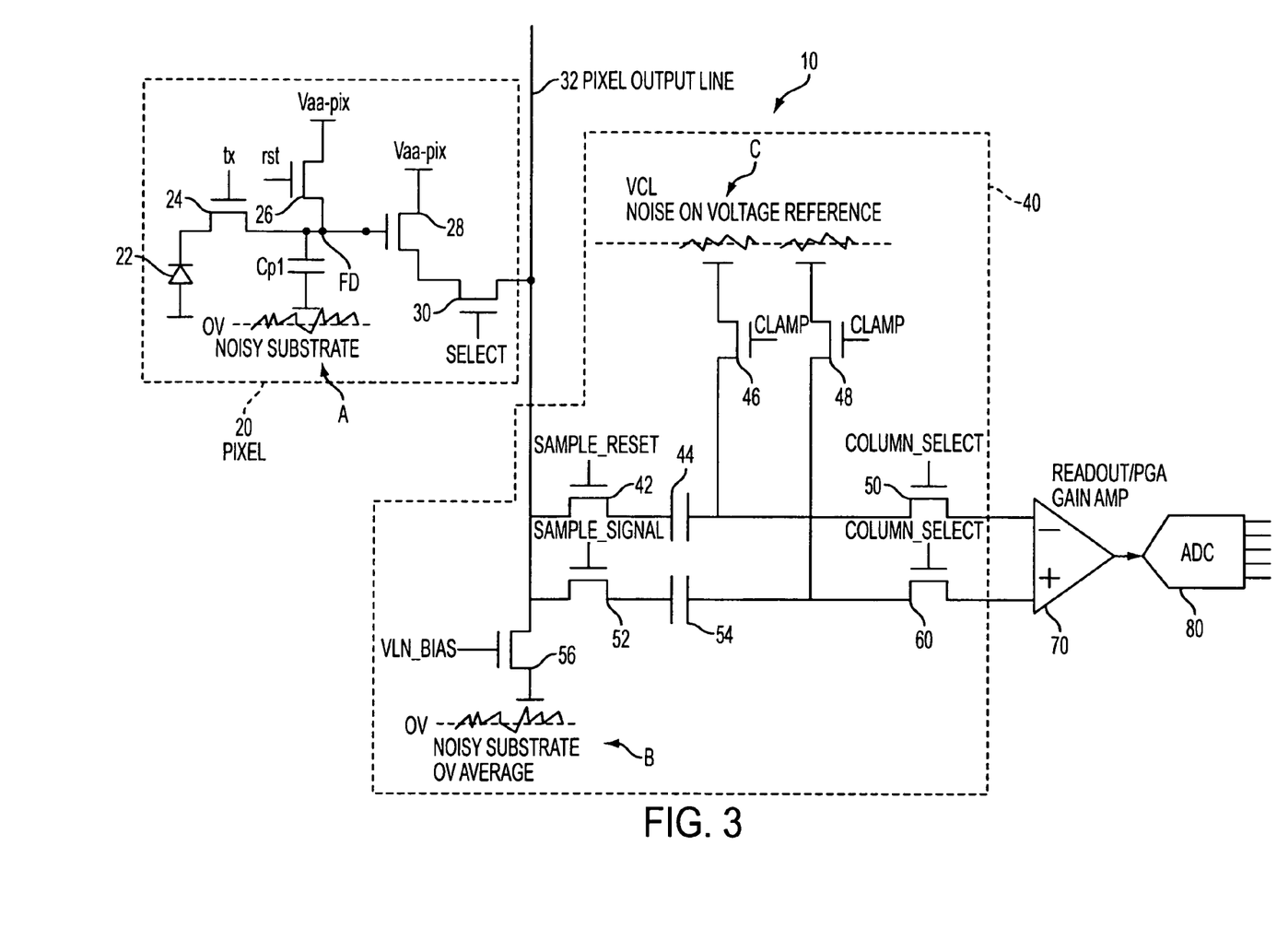
FIG. 3 is a diagram illustrating noise sources in the FIG. 1 imager.

As can be seen from FIG. 1, most of the pixel readout circuitry is designed to be fully differential to suppress noise (substrate or power supply noise), which could create undesirable image artifacts (e.g., flickering pixels, grainy still images). The readout circuitry for the illustrated four transistor ("4T") pixel, and known three transistor ("3T") pixels, however, is single ended. During the sampling of the reset or pixel signal levels (described above), any noise on the substrate ground or clamp voltage is inadvertently stored on the sampling capacitors 44, 54. FIG. 3 illustrates portions of the imager 10 that are subject to substrate noise (e.g., at the floating diffusion region FD in the pixel 20 (arrow A) and the bias transistor 56 in the sample and hold circuitry 40 (arrow B)) and noise on the clamp voltage VCL (e.g., at clamping switches 46, 48 (arrow C)).

Because the sampling of the reset and pixel signal levels occur at different times, the random noise will be different between the two samples. Some components of the noise, however, are common to all the pixels in a particular row (e.g., substrate noise that is picked up by the floating diffusion region FD and the clamp voltage noise). When the entire row of pixels is sampled, the noise appears as horizontal lines in the image that are superimposed on top of the actual image. This common noise is referred to as "row-wise noise" because the noise for the entire row is correlated. To remove row-wise noise, one technique which may be employed is the use of light shielded reference pixels in rows of the pixel array which has reset and signal values which are sampled. The signals produced by the reference pixels are used to remove noise from image pixels in the same row in a digital correction process. It has been discovered, however, that known methods of correcting for row-wise noise, such as, e.g., applying a digital correction, may result in an "overcorrection" of the pixel values.

Accordingly, there exists a need for an improved method and system for adjusting for the presence of row-wise noise in acquired images.

DETAILED DESCRIPTION

In the following detailed description, reference is made to the accompanying drawings which form a part hereof, and in which are shown, by way of illustration, specific embodiments. These embodiments are described in sufficient detail to enable those skilled in the art to make and use them, and it is to be understood that structural, logical or procedural changes may be made. Particularly, in the description below, processes are described by way of flowchart. In some instances, steps which follow other steps may be reversed, be in a different sequence or be in parallel, except where a following procedural step requires the presence of a prior procedural step. The disclosed processes may be implemented by an image processing pipeline which may be implemented by digital hardware circuits, a programmed processor, or some combination of the two. Any circuit which is capable of processing digital image pixel values can be used.

One method and apparatus for providing correction for row-wise noise in acquired images is disclosed in co-pending U.S. application Ser. No. 10/834,844, entitled SUPPRESSION OF ROW-WISE NOISE IN AN IMAGER, filed Apr. 30, 2004 ("the '844 application"), the entirety of which is incorporated by reference herein. In the '844 application, an imager having special light shielded reference pixels in each row of the imager's pixel array is provided. Ideally, the output of the reference pixels is only a black pixel signal and a reset signal which are combined and digitized in the same manner as the image and reset signals of the active pixels in a row. Since the reference pixels of each row experience the same row-wise noise as the active pixels in the associated row, the digitized optically black signals are used as reference signals to allow post-image processing to cancel out the row-wise noise seen in the digitized active pixel signals for a particular row.

Disclosed embodiments provide for improved row-wise digital correction in an imager. In disclosed embodiments, row-wise noise is corrected by applying only a fractional portion (e.g., a preferred digital correction fraction) of a possible maximum digital correction to the pixel signals during image processing. The maximum digital correction is determined from the reference pixels in each row. A preferred digital correction fraction is determined for each row during imager calibration. The determination is based on simulations that apply a range of possible fractions to data collected by the imager and then determine which of the possible fractions provides the best results for each row.

Figure 4:
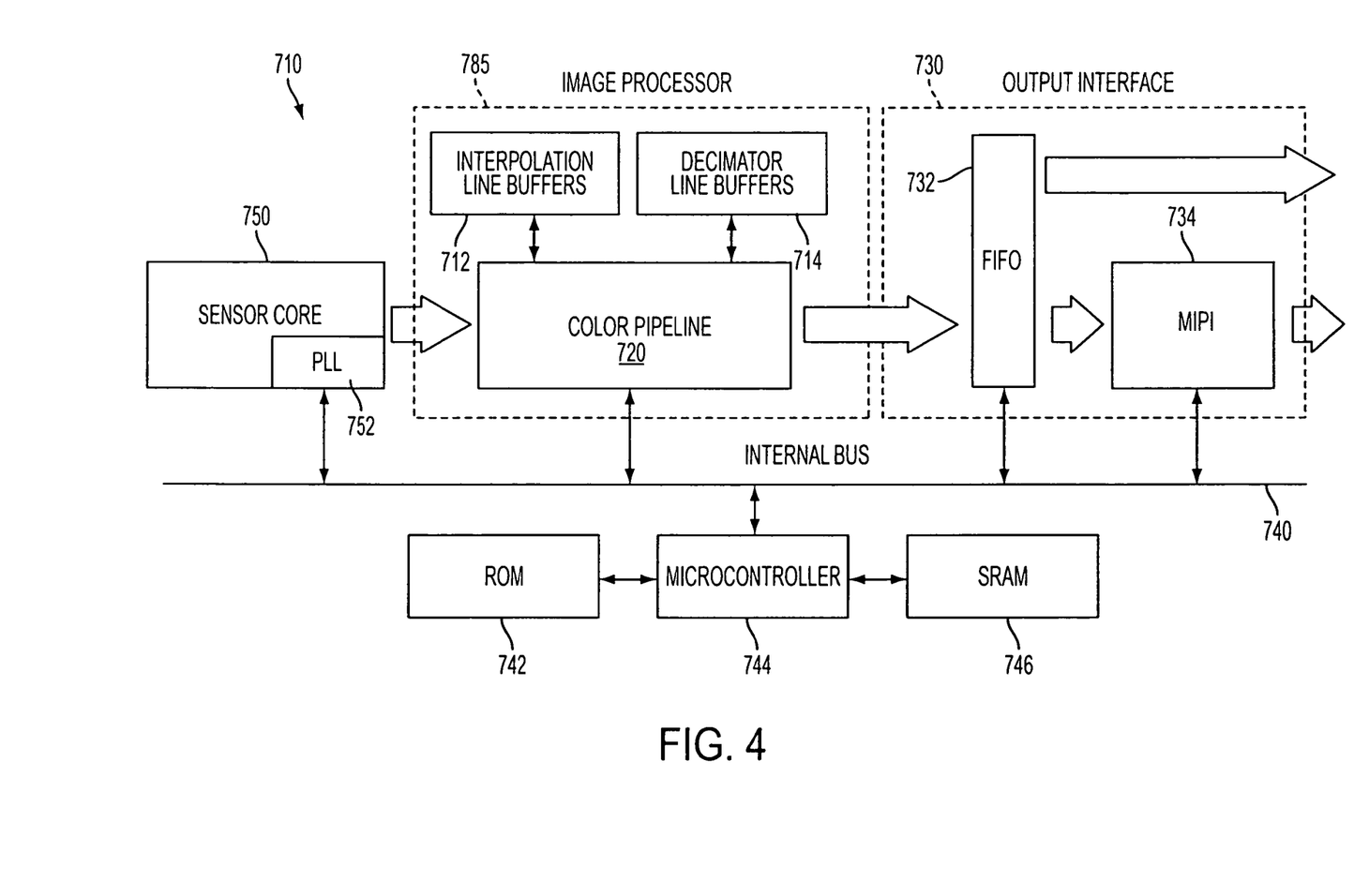
FIG. 4 is a block diagram of a system-on-a-chip (SOC) imager construction implementing disclosed embodiments.

Referring to the figures, where like reference numbers designate like elements, FIG. 4 illustrates a block diagram of a system-on-a-chip (SOC) CMOS imager 710 which may be used to implement disclosed embodiments.

Figure 5:
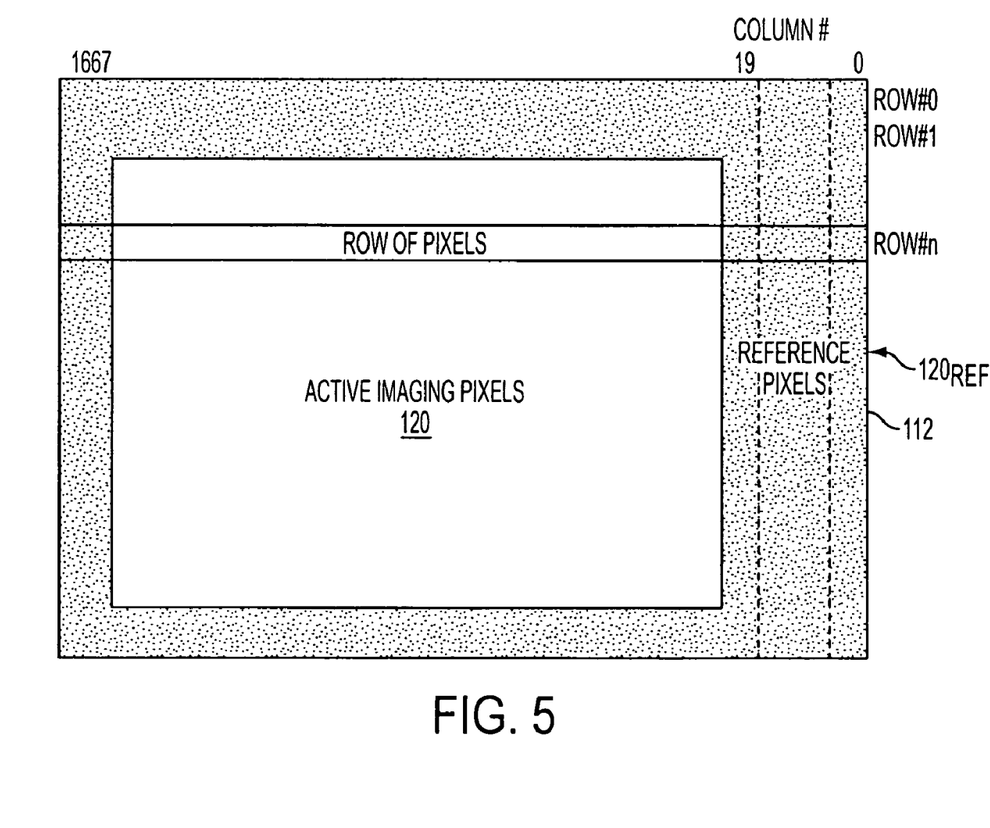
FIG. 5 is a diagram of a pixel array that may be used with the imager of FIG. 4.

The imager 710 comprises a sensor core 750 that communicates with an image processor circuit 785 that is connected to an output interface 730. Sensor core 750 may include a pixel array 112, having pixels and readout circuitry as depicted in FIG. 3, but with the pixel array partially shielded as illustrated in FIG. 5 to form active pixels for imaging and shielded reference pixels for row-wise noise correction, as discussed in more detail below. The ADC output of FIG. 3 corresponds to the output of sensor core 750 of FIG. 4, in that the ADC output is input into the image processor circuit 785. A phase-locked loop (PLL) 752 is used as a clock for the sensor core 750. The image processor circuit 785, which is responsible for image and color processing, includes interpolation line buffers 712, decimator line buffers 714, and a color processing pipeline 720.

The output interface 730 includes an output first-in-first-out (FIFO) parallel buffer 732 and a serial Mobile Industry Processing Interface (MIPI) output 734, particularly where the imager 710 is used in a camera in a mobile telephone environment. The user can select either a serial output or a parallel output by setting registers in a configuration register within the imager 710 chip. An internal bus 740 connects read only memory (ROM) 742, a microcontroller 744, and a static random access memory (SRAM) 746 to the sensor core 750, image processor circuit 785, and output interface 730. The imager 710 is operated by the microcontroller 744.

Referring now to FIG. 5, the pixel array 112 of imager 710 may comprise active imaging pixels 120 and reference pixels 120$_{REF}$, which are light shielded pixels associated with each row of active pixels 120. All of the pixels 120, 120$_{REF}$ may each have the construction of the 4T pixel illustrated in FIG. 1, or other types of known pixel architectures suitable for use in a CMOS imager (e.g., 3T, 5T, etc.).

One technique for light shielding the reference pixels 120$_{REF}$ is to cover them with a layer of metal. Because the reference pixels 120$_{REF}$ are light shielded, the only signal that should be read from them is dark current. The reference pixels 120$_{REF}$ experience the same row-wise noise superimposed on their signals that is experienced by the active pixels 120 within the same row. Therefore, the row-wise noise for each row in the array 112 can be determined from the corresponding reference pixels $120_{REF}$. Since row-wise noise is not random (i.e., all the pixels in the same row experience the same noise), each row's associated row-wise noise can be removed from the signals output by its associated active pixels 120 (as discussed below), based upon the noise seen on the reference pixels $120_{REF}$. It should be noted that the reference pixels $120_{REF}$ may be located on either or both sides of the array 112. Thus, the row-wise noise component of a given row could be determined from pixels on both sides of the array. It should also be appreciated that the reference pixels under the light shield should be placed away from the edge of the shield to prevent light leakage onto the reference pixels.

One of the functions of the image processor circuit 785 is the performance of row-wise digital noise correction in accordance with disclosed embodiments, discussed below. It should be appreciated that the image processor circuit 785 may be constructed in hardware, as a processor executing software, or a combination of the two. Moreover, the row-wise correction need not be performed by the image processor circuit 785 as other external imager processing circuits could also be used.

Since row-wise noise causes a random pixel signal offset for each row of an image, part of a row (i.e., reference pixels $120_{REF}$) can be allocated to evaluate the value of this signal offset. The offset (maximum digital correction value) for the $j^{th}$ row that is caused by row-wise noise is calculated as the average of the signal values of the reference pixels $120_{REF}$ for that row, in accordance with Equation (1):

$$S_{ref}(j) = \frac{\sum_{i=1}^{N_{ref}} S_{ref}(i, j)}{N_{ref}};$$ (1)

where $S_{ref}(j)$ is the maximum digital correction value for row j, $S_{ref}(i,j)$ is the signal value for pixel (i,j), and $N_{ref}$ is the number of reference pixels used for averaging. The maximum digital correction value for a given row is equal to an average of the pixel signal values for the reference pixels of that row. It should be noted that the maximum digital correction value may be different for each row of the pixel array 112.

In previously known row-wise noise correction methods, the maximum digital correction value, calculated in accordance with Equation (1), is merely subtracted from each active pixel 120 in the $j^{th}$ row, in accordance with Equation (2):

$$s_{active}^{new}(j) = s_{active}^{old}(j) - S_{ref}(j);$$ (2)

where $s_{active}^{new}(j)$ is the corrected signal value for a pixel, $s_{active}^{old}(j)$ is the pixel signal value read out from the pixel array 112, and $S_{ref}(j)$ is the maximum digital correction value for row j. This method of digital correction is referred to as a "simple subtraction."

It has been determined, however, that this simple subtraction method may not always produce a good digital correction and may actually lead to an "overcorrection" of the signals from the active pixels 120, which may result in insufficient image correction or may even cause more image degradation. It has been further determined that the "overcorrection" is actually a statistical effect caused by temporal noise in the imager. It has been even further determined that by applying only a portion of the maximum digital correction to the pixels, a better correction result can be achieved.

Disclosed embodiments determine a preferred digital correction fraction and apply only this fraction of the maximum digital correction to the active pixel signals 120 instead of applying the full maximum digital correction value. The preferred digital correction fraction is determined during imager calibration, as discussed below, and may depend on the imager's ratio of row-wise noise to total temporal noise. Once the preferred digital correction fraction (Fraction$_{preferred}$) is determined, disclosed embodiments apply this fractional portion of the maximum digital correction value for that row to the row pixel signals, in accordance with Equation (3):

$$s_{active}^{new}(j) = s_{active}^{old}(j) - \text{Fraction}_{preferred} \times S_{ref}(j).$$ (3)

where $s_{active}^{new}(j)$ is the corrected signal value for a row j pixel, $s_{active}^{old}(j)$ is the pixel signal value read out from the pixel array 112 for row j, Fraction$_{preferred}$ is the digital correction fraction applied to the maximum digital correction value before applying the result to the pixel signals, and $S_{ref}(j)$ is the maximum digital correction value for row j as defined in Equation (1) above. This correction is performed during image processing.

The corrected pixel signals provide an image for which row-wise noise has been reduced, but without overcorrection.

Figure 6:
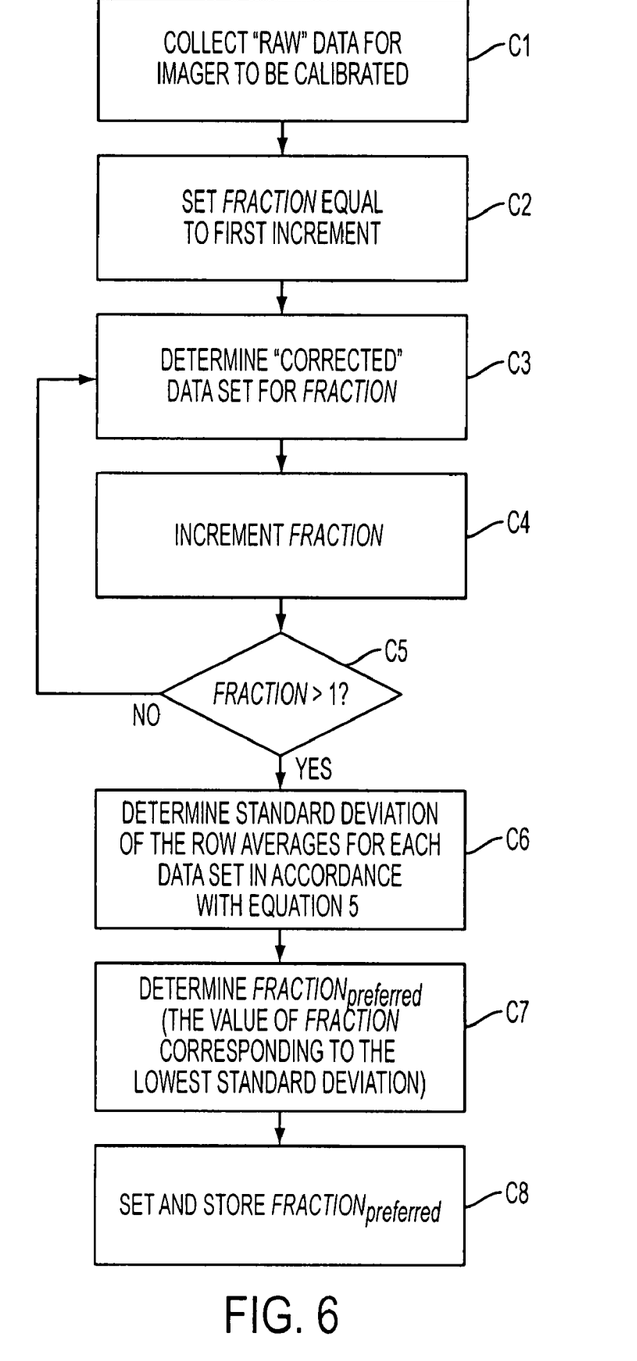
FIG. 6 is a flowchart of a method of imager calibration in accordance with disclosed embodiments.

The preferred digital correction fraction (Fraction$_{preferred}$) for an imager or group of imagers having similar row-wise noise characteristics is determined during calibration of the imager 710, as shown in flowchart form in FIG. 6. At step C1, "raw" (uncorrected) data from a captured image is collected from the imager to be calibrated. Data is collected for the active 120 and reference $120_{REF}$ pixels of the pixel array. The uncorrected data is image data collected under dark conditions, such as for example, low light conditions where the presence of noise is more discernable. For the calibration, several sets of "corrected" data are determined (from the set of "raw" data) for a predetermined set of incremental fractions, between 0 and 1, e.g., in steps of 0.05. The correction fraction (Fraction), is set to the first increment (e.g., 0.05) at step C2. (Note that a corrected data set is not determined for Fraction=0 since this will be the same as the raw data.)

At step C3, a "corrected" data set is determined for this particular Fraction value, in accordance with Equation (4):

$$s_{active}^{new}(j) = s_{active}^{old}(j) - \text{Fraction} \times S_{ref}(j).$$ (4)

where $s_{active}^{new}(j)$ is the corrected signal value for a pixel in row j, $s_{active}^{old}(j)$ is the pixel signal value read out from the pixel array 112 in row j, Fraction is the particular digital correction fraction for the corrected data set, and $S_{ref}(j)$ is the maximum digital correction value for row j (determined in accordance with Equation (1), as previously described). A complete set of corrected data is determined for this value of Fraction, e.g., a set of data is created, one value for each pixel in the pixel array, assuming a preferred digital correction value of Fraction.

The value of Fraction is incremented by the predetermined incremental amount (such as, in the example, by 0.05), at step C4. At step C5, it is determined if the value of Fraction is greater than 1 (the preferred digital fraction will be between 0 and 1, inclusive). If not, the calibration method returns to step C3 and repeats steps C3 through C5 for each remaining possible value of Fraction, until the value of Fraction is greater than one. At this point, a corrected data set has been determined for each of the predetermined incremental fractions. It should be noted that the predetermined increment may be an amount other than 0.05. Alternative embodiments may allow the Fraction values to not be equally spaced between 0 and 1 as well.

At this point, a corrected data set has been determined for each of the incremental fraction values of Fraction (C5=yes). In the example of a 0.05 incremental amount, a corrected data set is determined for each Fraction=0.05, 0.10, 0.15, 0.20, 0.25 . . . 0.80, 0.85, 0.90, 0.95, 1.00. Each set of data corresponds to a specific value of Fraction. Then, for each set of corrected data, the standard deviation of the row averages, $\sigma_{row}$, is calculated at step C6 in accordance with Equation (5):

$$\sigma_{row} = \sqrt{\frac{\sum_{j=1}^{N_{rows}} (S_{active}(j) - \overline{S})^2}{N_{rows} - 1}} \; ; \quad (5)$$

where $N_{rows}$ is the number of rows in pixel array 112, $S_{active}(j)$ is the average of the active pixel signal values of $j^{th}$ row and $\overline{S}$ is the average of the active pixel signal values for all rows within the pixel array for the same set of corrected data. This is performed for each of the sets of corrected data.

The preferred digital correction fraction (Fraction$_{preferred}$) is that corresponding to the corrected data set for which the standard deviation is the lowest (when compared to the standard deviations for each of the other corrected data sets). The value of Fraction corresponding to this lowest standard deviation value is determined at step C7. At step C8, the Fraction$_{preferred}$ value corresponding to the preferred digital correction fraction is set and may be stored in a register within the imager 710 for later use in image capture row-wise noise corrections. Then, a portion of the maximum digital correction for a given row, where the portion is equal to the preferred digital correction fraction (Fraction$_{preferred}$) multiplied by the maximum digital correction for the row, is applied to the active 120 pixel signals of the row during image processing of a captured image. It should be noted that the preferred digital correction fraction (Fraction$_{preferred}$) is the same for each row of the pixel array 112.

As noted, disclosed embodiments may be implemented for row-wise noise correction as part of an image processor circuit 785 containing a pixel signal processing pipeline which may be implemented as hardware circuits, by a processor executing a program, or by a combination of the two, etc. The calibration and correction methods may also be implemented as computer instructions and stored on a computer readable storage medium for execution by a computer or processor which processes raw pixel value from a pixel array, with the result being stored in an imager for use by an image processor circuit 785. Disclosed embodiments for row-wise noise correction may also be implemented as a stand alone processor, e.g., a programmed computer, operating on raw image data from sensor core 750.

Figure 7:
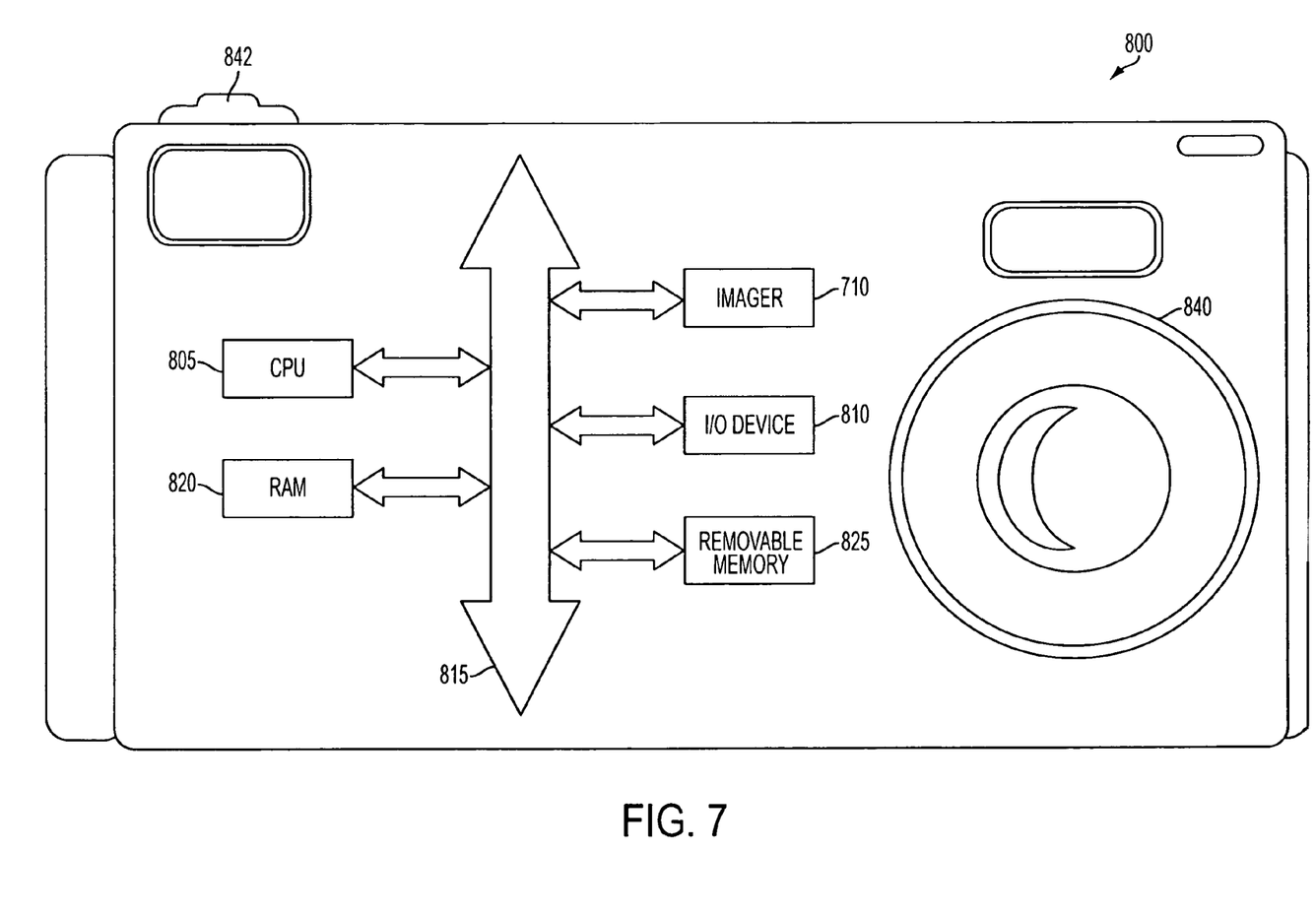
FIG. 7 depicts a camera system, for example, a digital still or video camera, which may employ an imager constructed in accordance with disclosed embodiments.

Disclosed embodiments may be implemented as part of a camera such as e.g., a digital still or video camera, or other image acquisition system. FIG. 7 illustrates a processor system as part of, for example, a digital still or video camera system 800 employing a system-on-a-chip imager 710 as illustrated in FIG. 4. The row-wise correction of disclosed embodiments may be implemented in the image processor circuit 785 of imager 710. The processing system includes a processor 805 (shown as a CPU) which implements system e.g., camera 800, functions and also controls image flow through the system. The processor 805 is coupled with other elements of the system, including random access memory 820, removable memory 825 such as a flash or disc memory, one or more input/output devices 810 for entering data or displaying data and/or images and the imager 710 through bus 815 which may be one or more buses or bridges linking the processor system components. The imager 710 receives light corresponding to a captured image through lens 840 when a shutter release button 842 is depressed.

While described embodiments have been described in detail, it should be readily understood that the invention is not limited to the disclosed embodiments. Rather the embodiments can be modified to incorporate any number of variations, alterations, substitutions or equivalent arrangements not heretofore described. Accordingly, the invention is not limited by the embodiments disclosed, but is only limited by the scope of the appended claims.

The processes and devices described above illustrate preferred methods and typical devices of many that could be used and produced. The above description and drawings illustrate embodiments, which achieve the objects, features, and advantages described herein. However, it is not intended that the embodiments be strictly limited to the above-described and illustrated embodiments. Any modifications, though presently unforeseeable, that come within the spirit and scope of the following claims is part of the claimed invention.

What is claimed as new and desired to be protected by Letters Patent of the United States is:

1. A method of setting an imager for image capture, comprising:
   capturing an image with a pixel array of the imager;
   obtaining image data from the array, the image data including active pixel signal data and reference pixel signal data;
   determining a plurality of corrected data sets, wherein each corrected data set is the active pixel signal data that has been corrected using a different incremental fraction value of a maximum digital correction, the maximum digital correction being obtained from reference pixel signal data;
   determining an average of the corrected active pixel signal data values for active pixels of a row, for each row of each corrected data set;
   determining a standard deviation for the row averages for each corrected data set; and
   setting based on values of the determined standard deviations, a fractional value that represents a portion of the maximum digital correction value to be applied to active pixel signals during image processing of a captured image.

2. The method of claim 1, wherein the preferred fractional value set is the incremental fraction value that corresponds to the corrected data set having the lowest standard deviation.

3. The method of claim 1, wherein reference pixels from which reference pixel signal data are input are shielded pixels.

4. The method of claim 1, wherein one of the plurality of corrected data sets is determined by subtracting, from each active pixel signal data value, a portion of the maximum digital correction corresponding to the pixel's row, wherein the portion subtracted is based on the incremental fraction value corresponding to the particular corrected data set.

5. The method of claim 4, wherein the maximum digital correction for row j is determined as the average of the reference pixel signal data values for row j.

6. The method of claim 1, further comprising storing the fractional value in a register on the imager.

7. An apparatus comprising:
   an image processor circuit configured to perform the acts of:
   receiving image data corresponding to a captured image, the image data including signal data from active pixels and from reference pixels;

determining a plurality of corrected data sets, wherein each corrected data set is the active pixel signal data that has been corrected using a different incremental fraction value of a maximum digital correction, the maximum digital correction being obtained from reference pixel signal data;

determining an average of the corrected active pixel signal data values for active pixels of a row, for each row of each corrected data set;

determining a standard deviation for the row averages for each corrected data set; and setting, based on values of the determined standard deviations, a fractional value that represents a portion of the maximum digital correction value to be applied to active pixels for row-wise noise correction.

8. The apparatus of claim 7, wherein the value that is set as the preferred fractional portion is the incremental fraction value that corresponds to the corrected data set having the lowest standard deviation.

9. The apparatus of claim 7, wherein the image processor circuit is further configured to determine one of the plurality of corrected data sets by subtracting, from each active pixel signal data value, a portion of the maximum digital correction corresponding to the pixel's row, wherein the portion subtracted is based on the incremental fraction value corresponding to the particular corrected data set.

10. The apparatus of claim 7, wherein the image processor circuit is further configured to determine the maximum digital correction for row j as the average of the reference pixel signal data values for row j.

11. The apparatus of claim 7, further comprising a register, wherein the value of the preferred fractional portion is stored in the register.

* * * * *